United States Patent

Andree et al.

Patent Number: 5,867,632
Date of Patent: Feb. 2, 1999

[54] SYSTEM AND METHOD FOR PROVIDING GLOSSY COMPRESSION AND CONTONE/BITONAL IMAGE CONVERSION

[75] Inventors: Fred W. Andree, Brookline, Mass.; Geoffrey A. Dreher, Nashua, N.H.

[73] Assignee: Xionics Document Technologies, Inc., Burlington, Mass.

[21] Appl. No.: 745,024

[22] Filed: Nov. 7, 1996

[51] Int. Cl.$^6$ .......................... G06K 15/00; H04N 1/405
[52] U.S. Cl. .................. 395/109; 395/114; 382/237; 382/252; 358/455
[58] Field of Search .................................. 382/237, 239, 382/270, 299, 252, 271, 272; 395/102, 112, 114, 115, 109; 358/404, 444, 429, 451, 430, 462, 456, 457, 458, 455, 534, 535, 536

[56] References Cited

U.S. PATENT DOCUMENTS

| | | | |
|---|---|---|---|
| 4,654,721 | 3/1987 | Goertzel et al. | 358/459 |
| 4,783,838 | 11/1988 | Matsunawa | 382/271 |
| 5,479,587 | 12/1995 | Campbell et al. | 395/114 |
| 5,602,976 | 2/1997 | Cooper et al. | 395/114 |
| 5,625,712 | 4/1997 | Schoenzeit et al. | 382/239 |

OTHER PUBLICATIONS

Robert Ulichney; "Digital Halftoning"; 1987; *Massachusetts Institute of Technology;* pp.: 238–243; 252–253; 264–269; 278–279; 292–293.

*Primary Examiner*—Scott Rogers
*Attorney, Agent, or Firm*—Fenwick & West LLP

[57] ABSTRACT

A printing system and method performs lossy compression on a bitonal image when the printing system runs out of available memory for processing a page. The lossy compression is performed by dividing the image into subregions and by then determining a contone value for each subregion. Next, each contone value is converted to a bitonal value (i.e. either a "1" or a "0") to achieve lossy compression. In converting the contone values to bitonal values, the system determines the error associated with each conversion and diffuses the error to adjacent subregions using a random perturbation technique to determine the proportion of the error to diffuse to each subregion. When compressing color images, contone values are determined for each color plane. A relative color ordering of each contone value is also stored and used in converting the contone values to bitonal values in order to solve phasing and color alignment problems which would otherwise arise.

12 Claims, 10 Drawing Sheets

SYSTEM AND METHOD FOR PROVIDING GLOSSY COMPRESSION AND CONTONE/BITONAL IMAGE CONVERSION

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

REFERENCE TO MICROFICHE APPENDIX

This disclosure includes a Microfiche Appendix having a total of 1 microfiche and a total of 19 frames.

BACKGROUND OF THE INVENTION

1. Field of the Invention

This invention relates generally to the field of digital printing and specifically to systems and methods for compressing bitonal black and white and color images.

2. Description of the Related Art

Conventional digital printing systems operate on bitonal images. Bitonal images are images, whether black and white or color, that are represented on a page by a plurality of dots or "pixels" wherein each dot (or "pixel") generally has one of two states (e.g. is either on or off). In these systems an "on" dot (or pixel) causes colorant to be applied and an "off" dot (or pixel) causes no colorant to be applied at the corresponding location on the page. In black and white systems, an "on" dot (or pixel) generally causes black colorant to be applied. Color systems similarly turn on and off dots (or pixels) to generate an image. Color systems, however, superimpose "dots" (or pixels) of different colorants to generate a desired color. For example, some color systems generate color by superimposing cyan, magenta and yellow (CMY) colorants or by superimposing cyan, magenta, yellow and black (CMYK) colorants. In such color systems, the bitonal color image is represented by a plurality of bitonal sets of data (color planes), each corresponding to a colorant.

Generally, an image is initially generated as a contone image and then later converted to a bitonal image for printing. For example, a person using an image editing program or using an image scanning device will generate a contone image and in the course of printing, the image is generally converted to a bitonal representation. A contone image is represented by a plurality of dots or pixels wherein each dot or pixel has a range of tonal values, as opposed to binary values as in bitonal images. Some examples of possible tonal ranges for each pixel in a contone images are 16 tonal values (4 bit), 32 tonal values (5 bit), 64 tonal values (6 bit), 128 tonal values (7 bit) and 256 tonal values (8 bit).

Conventional digital printing systems receive data corresponding to text and graphics in a variety of formats. These systems process such data to create bitonal images suitable for printing by the particular print engine in the system.

A conventional technique for processing images is to incorporate a microprocessor into a printing device, and to program the microprocessor to interpret commands from an attached computer in accordance with the protocols of a page description language. Such subsystems are commonly known as "interpreters", and translate the printing commands from the attached computer into commands and bitonal image data more easily processed by the printing device.

In practice, it is common for interpreters to decompose high-level commands corresponding to complex images into low-level commands representing, for instance, a collection of simple components known as "graphic primitives".

Two system architectures are commonly used in the industry for further processing of the low-level commands produced by page description language interpreters. The first, known as a "frame buffer", represents every bitonal pixel on a printed page as a separate bit or, in the case of color, as a set of bits in random access memory (RAM). Under this system, any page that can be described as a map of bitonal pixels can be printed. Frame buffer systems typically must process the information to be displayed on a frame-by-frame basis in which each frame must be rasterized and the data therein sent serially to the print engine. Furthermore, a substantial amount of frame buffer RAM is required to store information for the page, even when the image to be printed is extremely simple.

The second common architecture, known as "banding", stores all of the graphic primitives to be printed on the page, such as characters, graphics, images, and the like, in one or more "display lists" stored in the RAM of the printing system. One example of a system using such an architecture is disclosed in U.S. Pat. No. 5,500,928 issued to Cook et. al, the contents of which are incorporated herein by reference. A display list is typically a temporally-ordered list of graphic primitives for one area of the page, typically a horizontal band. Each display list is rasterized in turn into one of a small number of band bit maps (or "pixel maps"), or buffers, the contents of which are sent in turn to the print engine. The band buffers are reused during the processing of all the display lists of the page. Typically, most of the rasterization into band pixel maps occurs after the print engine has started to print the page. In the typical laser printer, the engine cannot be stopped in the middle of a page, so this rasterization must be fast enough to keep up with the print engine. In banding systems, relatively little RAM is required to print simple pages, and processing of one page while another page is printing is possible. However, for very complex images the size of the lists can exceed the RAM resulting in an error. Thus, sufficient RAM for handling such complex images must be provided or an error will result. Additionally, the bands must be rasterized within the time requirements of the printer engine or an error will result.

Some prior art systems perform lossless compression on selected bands of bitonal image data when the memory requirements for the bitonal image approach or exceed the available memory. In some instances, however, the lossless compression does not provide sufficient compression to meet the memory constraints of a particular system and in these instances, a page prints with an error such as being printed across multiple sheets.

SUMMARY OF THE INVENTION

The system and method of the present invention avoids out of memory printing errors by performing lossy compression on a bitonal image being processed for printing. The system and method performs the lossy compression by spatially dividing the image into a plurality of subregions (also called "pixel blocks" or "pixel groups") and by then assigning a single contone value to each region. The image is thus converted to a contone image having a reduced resolution. The contone image is next converted to a bitonal image by substituting a bitonal value for each contone value thereby achieving data compression. To minimize image degradation, the conversion process diffuses the error generated in the conversion of each contone value to a bitonal value to adjacent pixel blocks. Thus, the image is lossy compressed with a compression ratio proportional to the number of pixels in each subregion. The image is then decompressed prior to printing.

In accordance with one aspect of the invention, during compression the error is diffused using a random perturbation technique to diffuse the conversion error to a horizontally adjacent and to a vertically adjacent subregion. In accordance with this aspect of the invention, the variance of the random number is proportional to the magnitude of the conversion error.

In another aspect of the invention, the bitonal image is a color image. In accordance with this aspect of the invention, the image is divided into a plurality of subregions (also called "pixel blocks" or "pixel groups"). Contone values are determined for each color plane of each subregion. For each subregion, the contone values are compared to determine a relative density ordering for each color plane. The relative density ordering is stored for use in conversion. The image is then converted to a contone image having a reduced resolution. In accordance with this aspect of the invention, the contone image includes a set of contone color planes, one for each of the plurality of color planes associated with the color image. Next, the contone image is converted to a bitonal image by converting each contone value to a bitonal value (i.e. to either "on" or "off" or either "1" or "0"), also using error diffusion. In accordance with this aspect of the invention, the conversion of each color plane to a bitonal representation is not performed independent of the other color planes but instead the conversion is performed in accordance with the relative density ordering of the contone values which were previously stored. If any color plane of a subregion is set to the "on" state (i.e. if the bitonal value is set to "1"), then any color plane in the same subregion that had a larger or equal contone value will similarly be set to "on."

Further in accordance with this aspect of the invention, the system and method stores the relative density ordering using a code such as an integer code.

Still further in accordance with this aspect of the invention, during compression the error is diffused using random perturbation to diffuse the conversion error to a horizontally adjacent and to a vertically adjacent subregion. In accordance with this aspect of the invention, the variance of the random number is proportional to the magnitude of the conversion error.

In yet another aspect of the present invention, the system and method processes a contone color image to generate a bitonal color image. The contone color image is divided into a plurality of subregions. The subregions may be either a block or group of pixels or may be a single pixel depending on the amount of data reduction desired. If the subregion has a single pixel, then the pixel value is the contone value for the subregion. If, however, the subregion includes a plurality of pixels, then the system and method computes a contone value for the subregion using the contone values of each pixel in the subregion. For each subregion, the contone values are compared to determine a relative density ordering for each color plane. The relative density ordering is stored for use in conversion bitonal image values. A bitonal value is next computed for each color plane of each subregion. A bitonal value for each color plane of each subregion is selected responsive to the subregion contone value for that color plane and the relative density ordering.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION OF THE PREFERRED EMBODIMENTS

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
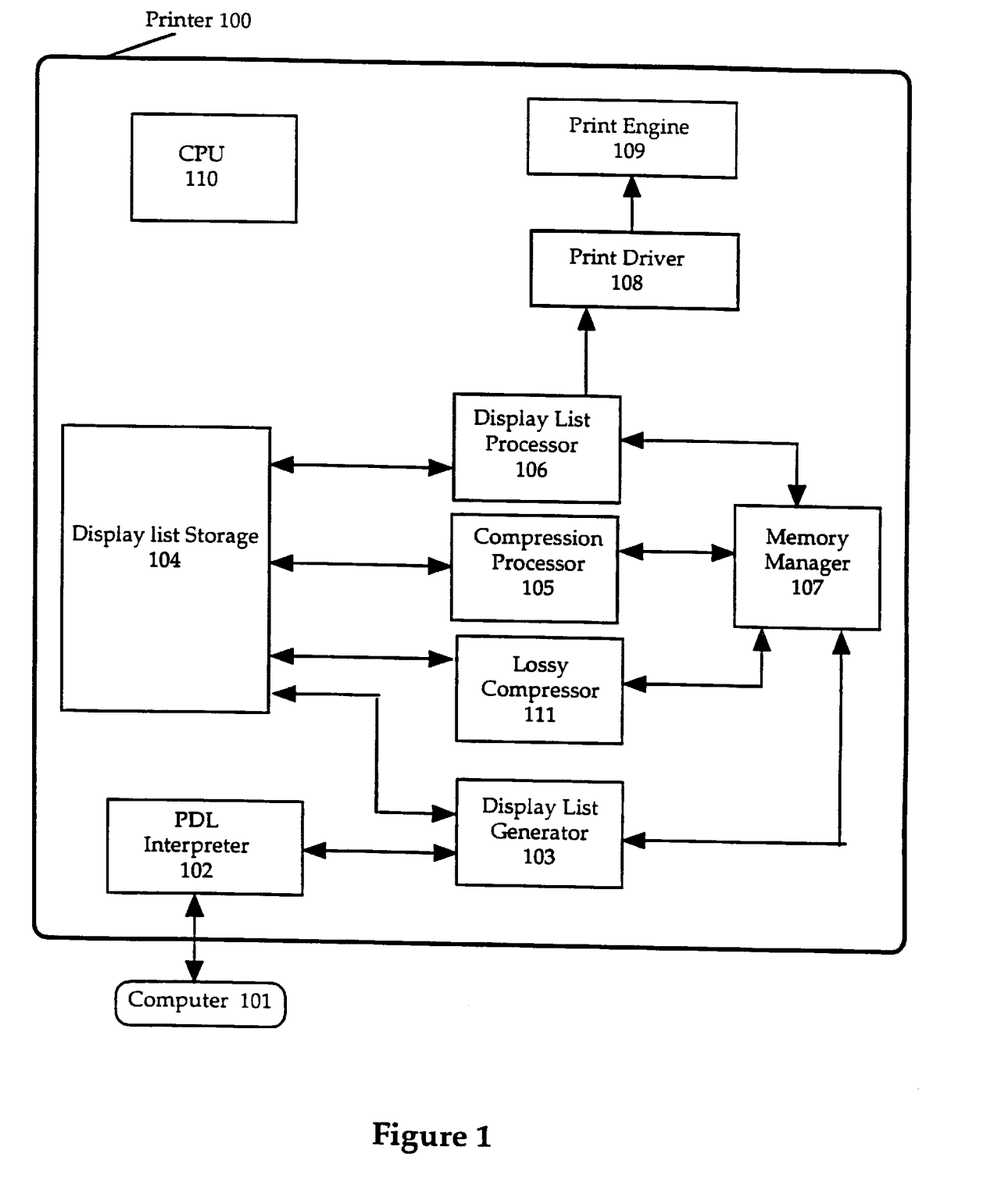
FIG. 1 is a block diagram of a printer in accordance with the present invention.

Referring now to FIG. 1, there is shown a block diagram of a printer 100 in accordance with the present invention. It should also be understood that printer 100 is a printing device such as a dedicated output device or is a printing portion of a multifunction peripheral device (MFP). An MFP is a peripheral device which provides several functions such as printing, copying, scanning and facsimile transmission.

Printer 100 includes a central processing unit ("CPU") 110, a page description language ("PDL") interpreter 102, a display list storage device 104, a display list generator 103, a compression processor 105, a memory manager 107, a display list processor 106, a printer driver 108, a print engine 109 and a lossy compressor 111. Printer 100 receives printing commands in a PDL from an external computer 101 in a conventional manner, for example via SCSI, RS-232, "AppleTalk" or Centronics interfaces. CPU 110 is preferably implemented using a PowerPC processor available from International Business Machines, Inc. (IBM) or from Motorola Corporation, but any popular microprocessor such as an AMD 29240 by Advanced Micro Devices may be used in accordance with the invention. To keep FIG. 1 uncluttered, connections between CPU 110 and the other components of printer 100 are not shown, but it should be recognized that CPU 110 is employed to provide processing resources as needed for components 102–109 and component 111. Additionally, some components include application specific integrated circuit (ASIC) subcomponents that perform certain processing functions. For example, lossy compressor 111 may include an ASIC sub component.

In a preferred embodiment, the image storage device 104 is implemented using conventional dynamic random access memory, specifically either one-half or two megabyte memory chips available, for instance, from Texas Instruments Corporation. In a typical application having 600 dot per inch resolution for black and white printing on letter- or legal-sized paper, two megabytes of memory is preferably used for image storage device 104, and is also made available as needed for temporary storage by other components of printer 100. In a preferred embodiment, PDL interpreter 102, display list generator 103, compression processor 105, display list processor 106, memory manager 107 and printer driver 108 are not separate physical devices, but are logical devices implemented through stored computer programs operating in conjunction with CPU 110.

In a preferred embodiment, print engine 109 is implemented using a conventional laser print engine available, for instance, from Sharp Corporation, but it should be recognized that other devices could be used in accordance with the invention.

In operation, computer 101 sends high level printing commands to PDL interpreter 102. Interpreter 102 converts those commands to graphic primitives. These primitives are sent to display list generator 103, which creates a number of spatially distinct display lists and stores primitives as appropriate in corresponding ones of those lists. Memory manager 107 maintains a history of access to display list storage 104 via the actions of display list generator 103, compression processor 105, lossy compressor 111 and display list processor 106 and thereby keeps track of the amount of available memory capacity in display list storage 104. If the memory requirements of new graphic primitives being processed by display list generator 103 exceed the available capacity of display list storage 104, memory manager 107 instructs display list generator 103 not to write the new primitives to display list storage 104 until more memory is made available. If available capacity is sufficient for current requirements, display list generator 103 simply stores the new primitives in the appropriate display lists in display list storage 104.

In accordance with the present invention, the type of data stored in display lists may vary. A display list may contain graphic primitives alone, uncompressed pixel representations alone, compressed pixel representations alone, or a combination of graphic primitives and compressed pixel representations. In the latter two cases, compressed pixel representations may be added to and manipulated in display lists in a similar manner to graphic primitives. Further, the compressed pixel representations may be either lossy or lossless.

Memory manager 107 instructs compression processor 105 to increase available capacity by adaptive compression, as described in the U.S. Pat. No. 5,500,928 issued to Cook et. al, the contents of which has been incorporated herein by reference. In the event that the lossless compression techniques of compression processor 105 fail to increase the available memory by a sufficient amount, then memory manager 107 instructs lossy compressor 111 to increase available memory using lossy compression as described in more detail below.

When all of the commands for processing a particular page have been processed and the corresponding graphic primitives stored in display list storage 104, display list processor reads the display lists in the order needed for printing and converts the display lists to raster form. Since some display lists may already be in uncompressed raster form, this conversion may in some instances be trivial. Printer driver 108, a conventional system software module, then receives this data from display list processor 106, converts it to a form usable by print engine 109, and sends it to print engine 109 to draw the image.

Figure 2:
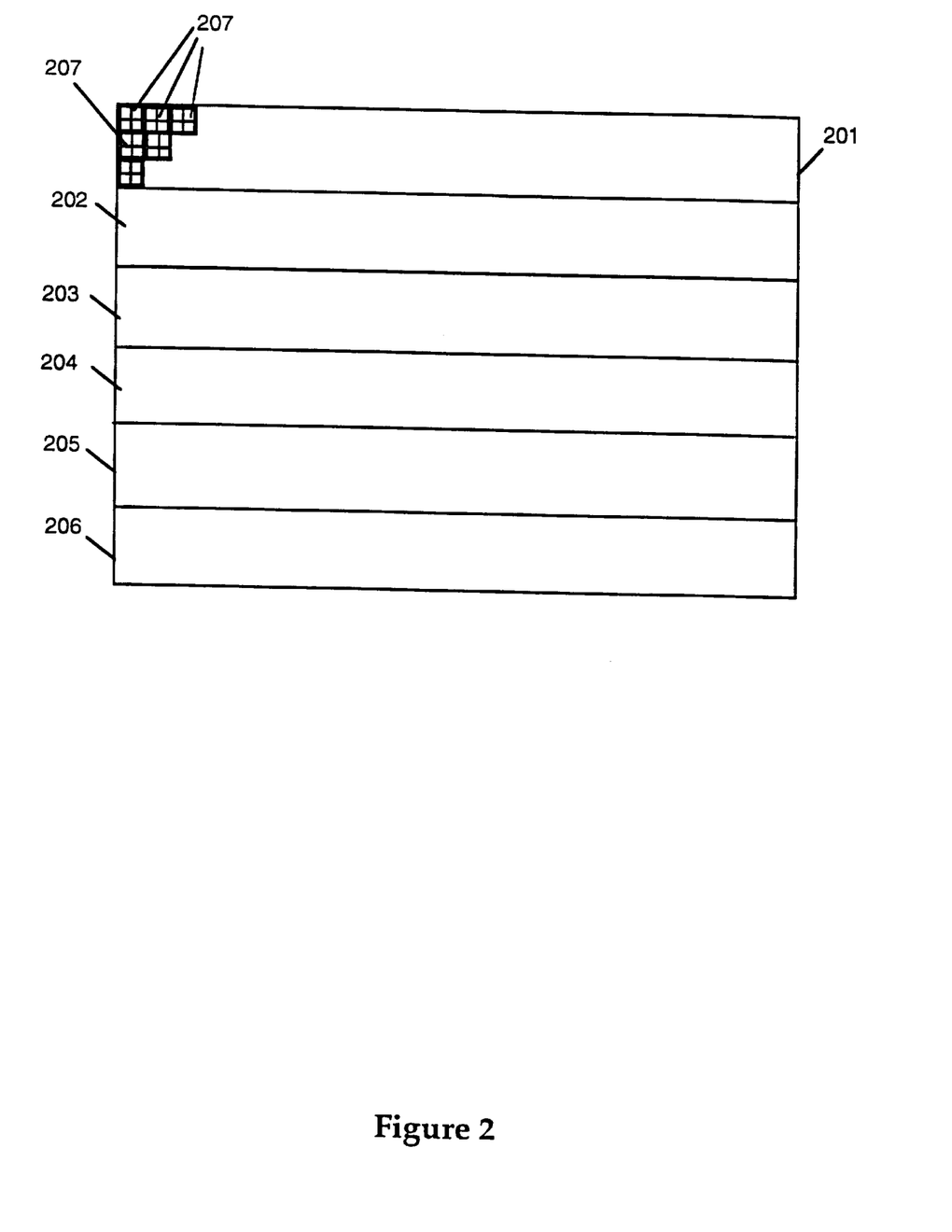
FIG. 2 is a representation of a page divided into six processing bands.

Referring now to FIG. 2, there is shown a representation of a page 200 as a collection of six bands, 201–206. In a preferred embodiment, a typical page is divided into many more bands, but for clarity of illustration only six bands are illustrated in FIG. 2. It should be recognized that any convenient division of a page may be used in accordance with the present invention. For instance, in some cases, efficiencies may dictate division into segments, for example, a grid of segments which do not span the entire page. Other applications may find purely vertical divisions advantageous.

Figure 3:
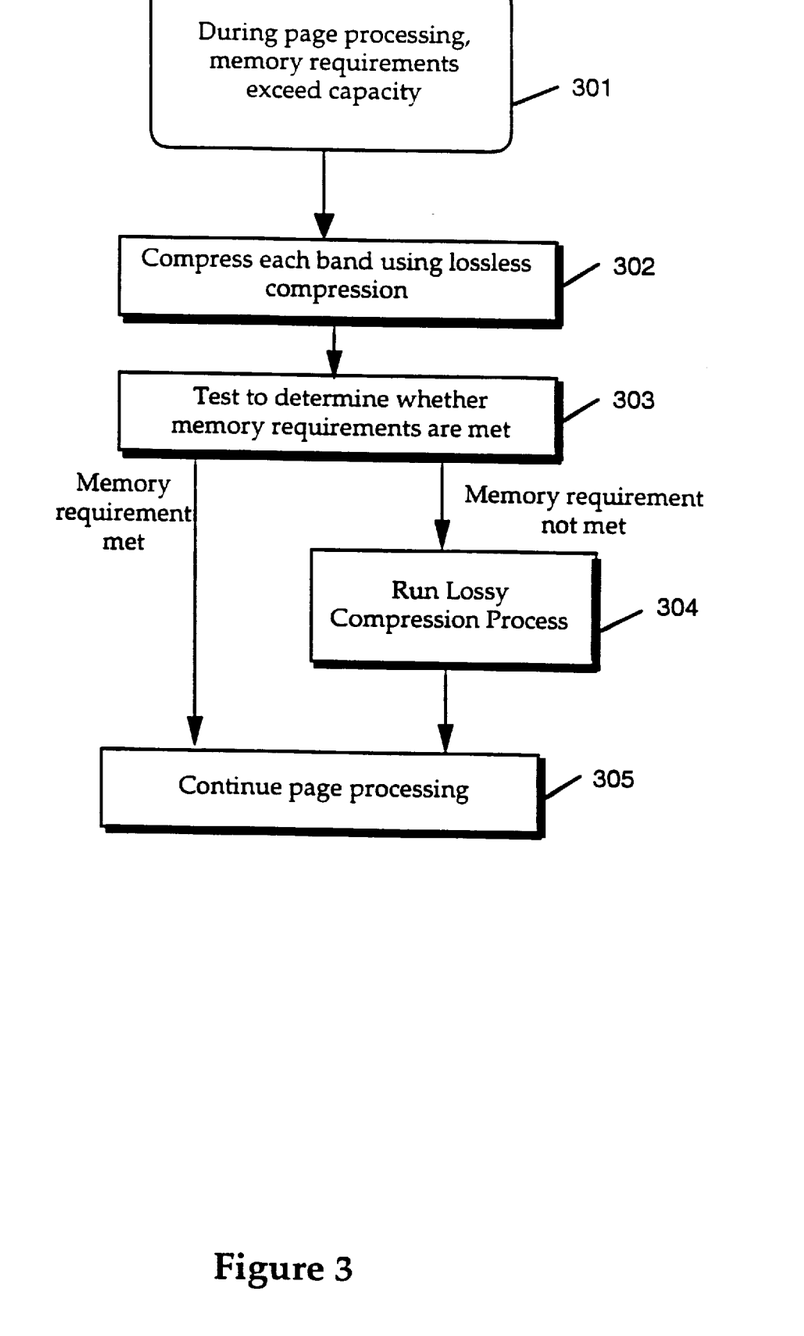
FIG. 3 is a flow diagram of a page processing method that is triggered when memory requirements exceed available memory in the printing system shown in FIG. 1.

FIG. 3 is a flow diagram of page processing method that is triggered when memory requirements exceed available memory. Referring again to FIG. 1 and now also to FIG. 3, as computer 101 processes PDL commands to generate bitonal image data to send to printer 100, memory requirements sometimes exceed 301 available memory. In the event that the memory requirements exceed 301 available memory, memory manager 107 causes compression processor 105 to perform lossless compression 302 on one or more bands to make more memory available. After compressing the bands using lossless compression 302, the memory manager 107 determines 303 whether the memory requirements are now met. In the event that lossless compression does not free up sufficient memory, memory manager 107 instructs lossy compressor 111 to compress one or more bands using lossy compression 304. After lossy compression of the bands, page processing continues 305 page processing. If, however, memory manager 107 determines 303 that lossless compression freed up sufficient memory for processing, then page processing continues 305 without resorting to lossy compression 304.

Figure 4:
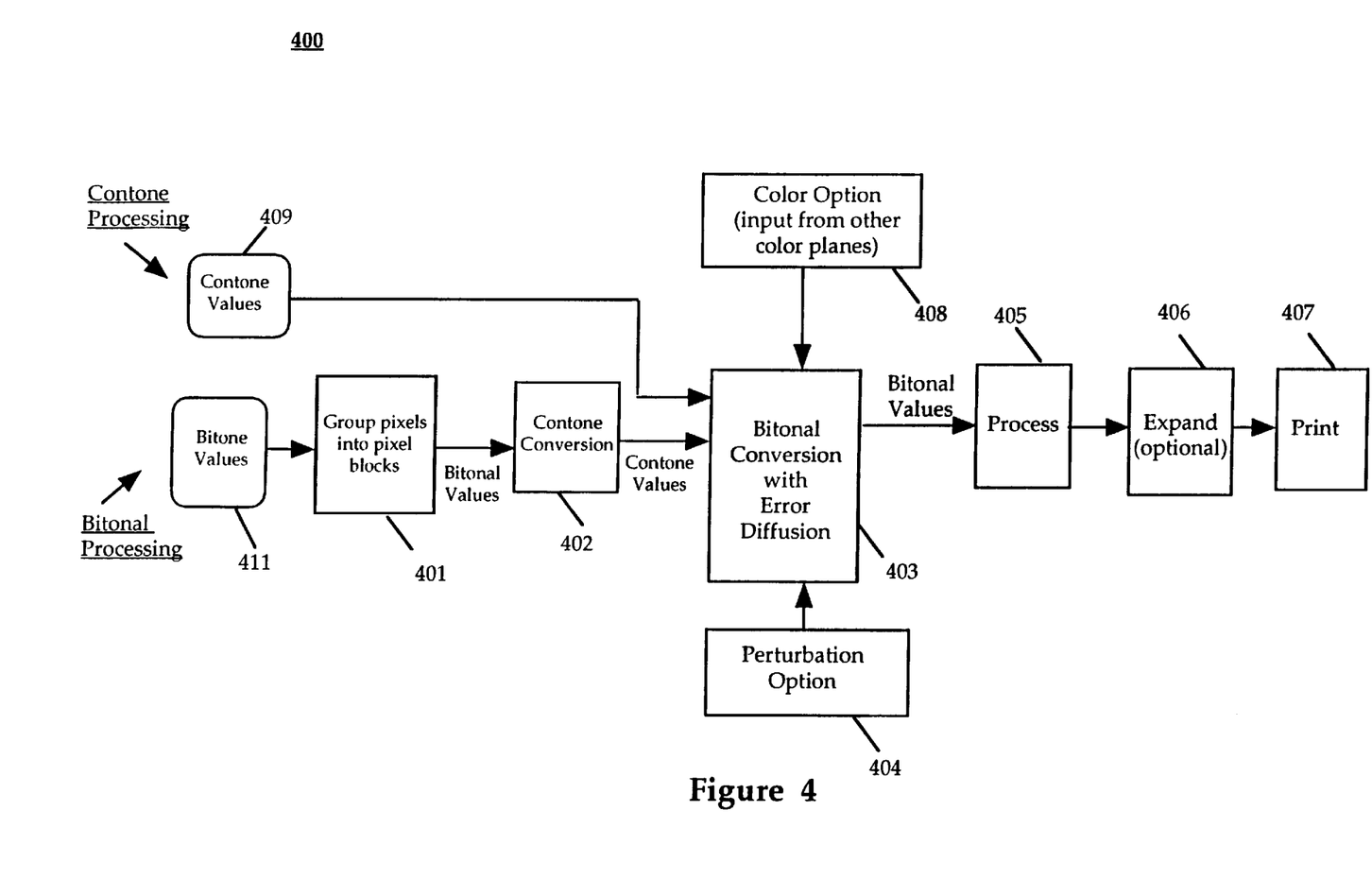
FIG. 4 is a system flow diagram of the processing performed by the lossy compressor in the printing system shown in FIG. 1.

FIG. 4 is a system flow diagram of the processing performed by lossy compressor 111. The flow diagram shows the lossy compression of an image band included in either a bitonal image 411 or a contone image 409. In the case of bitonal image 411, the image band is represented by bitonal values (i.e. by a collection of binary pixels or dots set to either "1" or "0"). The image band is first divided 401 into subregions which are groups of pixels (pixel groups or pixel blocks) 207 as shown in FIG. 2. Each pixel block 207 is preferably a 2×2 pixel square. Although the preferred grouping is into a group of four pixels, pixel groups of other sizes and other dimensions may be selected in accordance with the present invention. Additionally, although arbitrarily shaped pixel groups may be selected, it is preferable to select pixel groups which are shaped to form a tessellation pattern so that the pixel groups span the image without overlap and without excluding any pixels.

After dividing (grouping) 401 the pixels into pixel blocks, contone conversion 402 is performed to convert the pixel blocks from a set of bitonal values (each pixel is represented by a bitonal value prior to this conversion step) to a single contone value. Preferably the contone value is determined by counting the number of "on" pixels in the pixel group. This contone conversion 402 may also be achieved by adding the pixel values when "1" represents an "on" pixel and "0" represents an off pixel. Thus, the contone values will be a number between 0 and 4. Other methods of determining a contone value from the set of bitonal pixels may alternatively be used to perform contone conversion 402 in accordance with the invention. After converting 402 the pixel group to a single contone value, the contone value is next converted 403 to a bitonal value (a single binary pixel) using error diffusion as described in greater detail below. This bitonal value is also referred to herein as a representative pixel. Random perturbation 404 of the error diffusion is optionally implemented. The bitonal values are then used for the duration of continued page processing 405. Thus, for the remainder of the page processing, the band is represented in this reduced form thus decreasing overall memory requirements during page processing 405. After completion of page processing 405, the band is expanded 406 for printing 407. Expansion 406 is performed by reconstructing the pixel group. The pixel group is reconstructed by assigning to each pixel in the group, the same value as the representative (bitonal) pixel. Thus, temporary image reduction is achieved until expansion 406. When a band is divided into a collection of four pixel blocks, four to one data reduction is achieved. Greater data reduction would be achieved by selecting larger pixel blocks. Treating each pixel block as a contone value and diffusing the error accordingly avoids a significant degradation of image quality.

Referring still to FIG. 4, the present system is adapted to lossy compress both black and white and color bitonal images. In the case of color bitonal images, the conversion 403 from contone values to bitonal values is performed using the contone information 408 associated with the other color planes in order to reduce phase mismatch (color misalignment) which would otherwise occur during the error diffusion process. In one embodiment the contone information 408 is a stored relative density ordering of each color plane as discussed below.

Referring still to FIG. 4, the system and method is also adapted to perform contone processing. When configured to perform contone processing, the system and method converts a color contone image 409 to a color bitonal image. Because image 409 is a color contone image, a single pixel is a contone value. When performing contone processing, bitonal conversion 403 uses contone information 408 associated with the other color planes in order to reduce phase mismatch (color misalignment) which would otherwise occur during the error diffusion process. After bitonal conversion 403, the bitonal image is processed 405 for printing without expansion 406. Program code implementing the method of processing a contone image is shown in the Microfiche Appendix, incorporated herein by reference.

Figure 5:
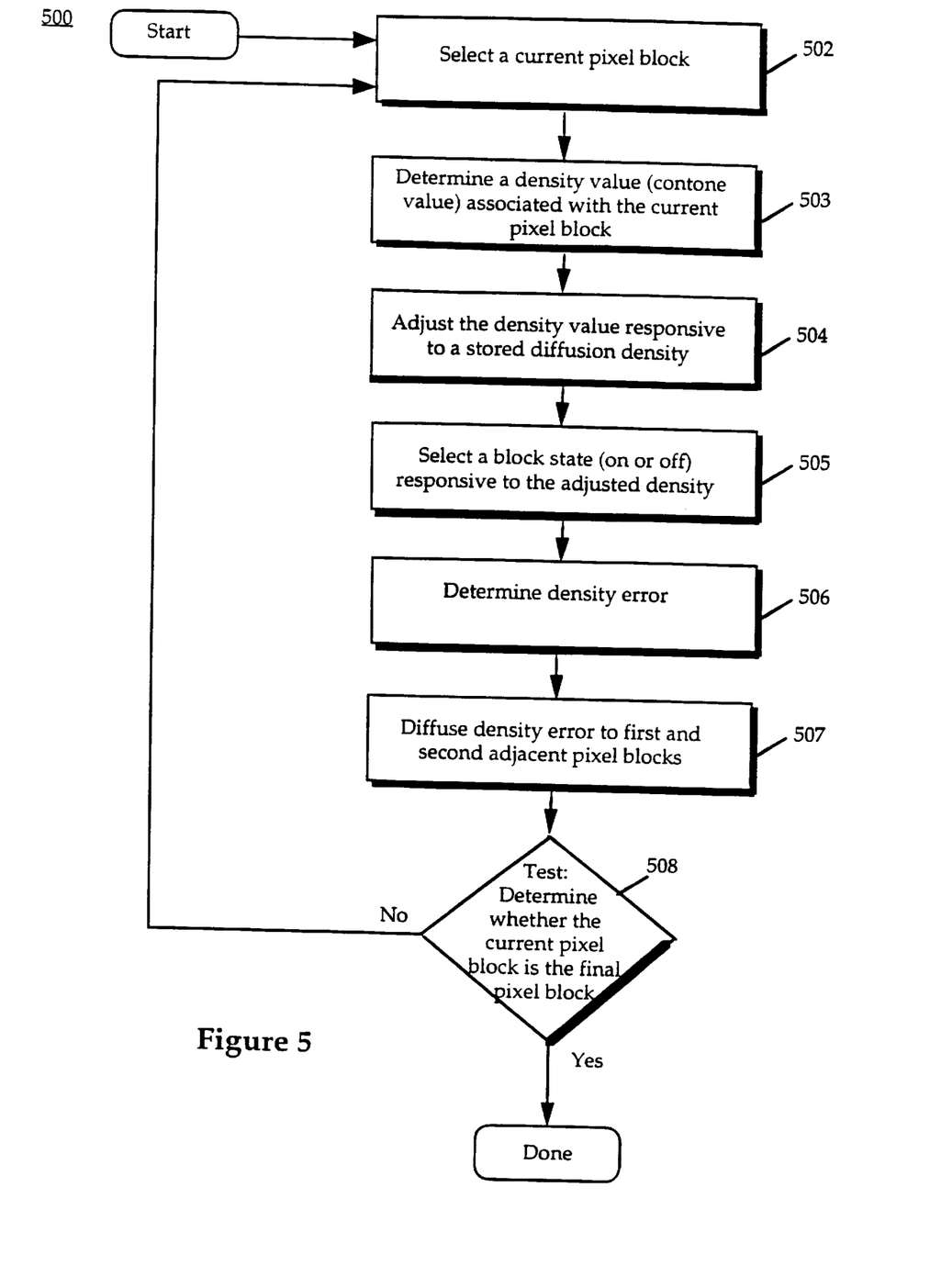
FIG. 5 is a flow diagram of a lossy compression method that performs the contone conversion and the bitonal conversion shown in FIG. 4 on a black and white image.

FIG. 5 is a flow diagram of a lossy compression method 500 that performs conversion (402 and 403) applied to an image band of a black and white image (either bitonal or contone). The method 500 starts with the selection 502 of a current pixel block. In the case of a bitonal image, the pixel block includes more than one pixel, preferably four. In the case of a contone image, however, a single pixel is selected and thus the "pixel block" is a single pixel. The method 500 next performs contone conversion 503 by determining a density value associated with the current pixel block. In the case of a bitonal image, the density value corresponds to the number of "on" pixels (for example, the number of black pixels) in the pixel block. Because the pixel block includes four bitonal pixels, the computed density will be between zero and four. This density is a contone value. In the case of a contone image, contone conversion 503 simply retrieves the contone value associated the selected pixel block. No computation is necessary because the selected pixel block includes just one pixel and that pixel is already a contone value. The method next adjusts 504 the determined density value (the contone value) in accordance with a previously calculated error diffusion value. If the current pixel block is the first pixel block of the band, however, no adjustment 504 is performed. After adjusting 504 the density value (the contone value) a block state (either on (black) or off (white)) is selected 505 and then assigned to a representative pixel (a single bitonal value). In the preferred embodiment, an adjusted density of 50% or greater (i.e. 2 or greater) sets the block state to "on" ("black") and a density of less then 50% (less than 2) sets the block state to "off" ("white"). Once the block state is selected 505, then a density error is determined 506. Preferably the error is determined by subtracting the contone value associated with the pixel block from four times (because there are four pixels per pixel block) the value of the representative pixel.

The density error previously determined 506 is then diffused 507 (as further described in reference to FIG. 6) onto adjacent pixel blocks. Error diffusion 507 adds part of the error to the next horizontal pixel block (i.e. the pixel block to the "east") and part of the error to the pixel block below the current block (i.e. the pixel block to the "south"). After diffusing the error, the method 500 next determines whether the current pixel block is the final pixel block. If the current pixel block is not the final pixel block, then the method selects 502 a next pixel block, otherwise lossy compression of the band is complete.

Figure 6:
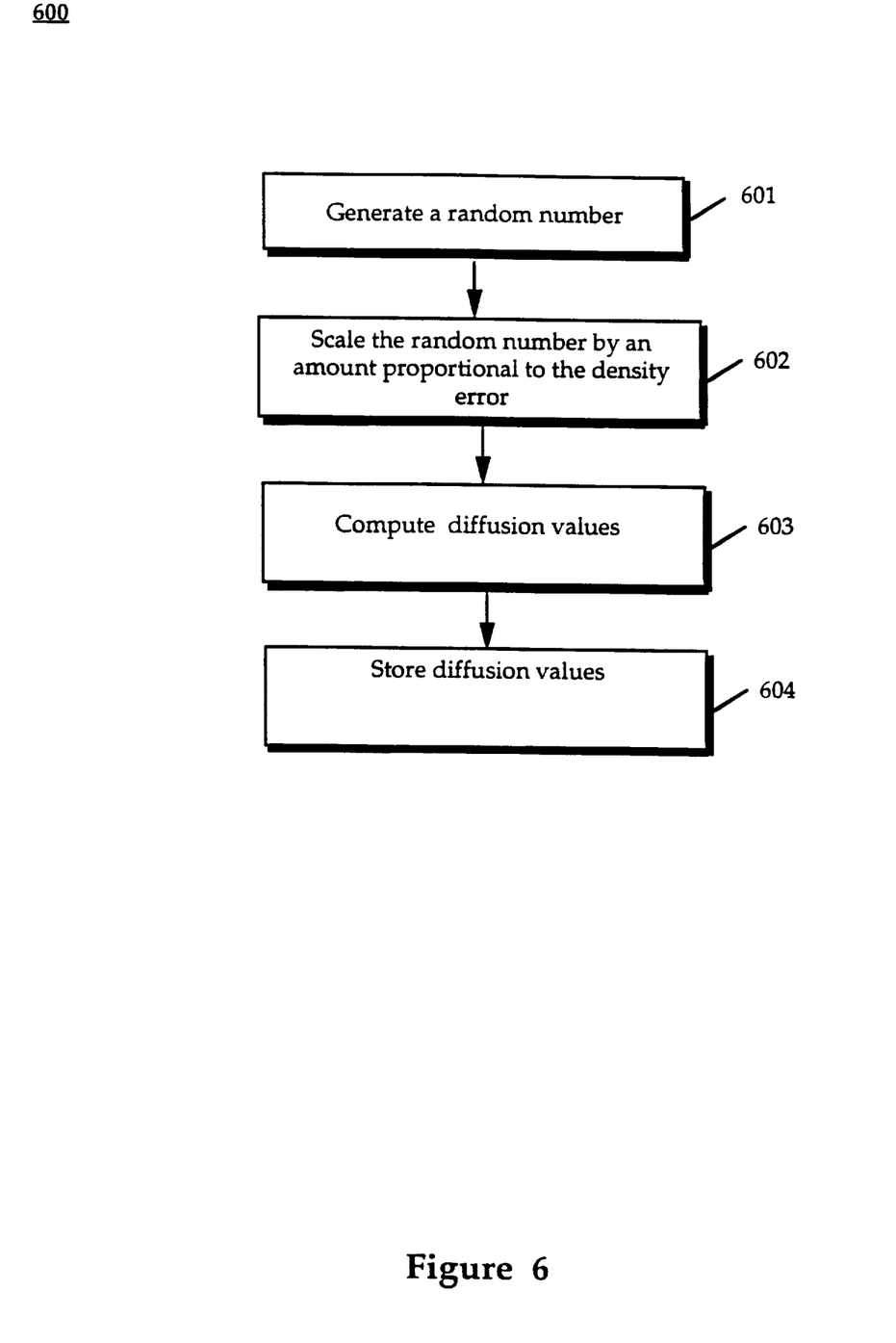
FIG. 6 is a flow diagram of a method of error diffusion shown in FIGS. 5 and 7 in accordance with the present invention.

FIG. 6 illustrates a method 600 of error diffusion using random perturbation in accordance with the present invention. In accordance with the error diffusion, the previous density value and calculations are scaled to a range of 0 to +255 where 255 represents the density of an all "off" ("white") pixel block and 0 represents the density of an all "on" ("black") pixel block. Other ranges may be selected. Preferably, the value selected for a white pixel block (e.g. 255) is a number that is a power of two minus one so that it is scalable. For example, if each pixel block is represented by a six bit contone value rather than an eight bit contone value, then the value selected for white (i.e. the maximum value) would be 63. It should be noted that although the contone values are unsigned numbers (they are not less than 0), during the error diffusion process, contone values may temporarily take on values less than 0 (e.g. −128) or greater than the 255 maximum (e.g. 383). Thus, during the random perturbation process, the number space is asymmetric (ranging from −128 to 383). In order to accommodate this asymmetric range, the computer code stores the contone values as 16-bit integers during the random perturbation process. The method 600 first generates 601 a pseudo-random number. The pseudo-random number is then scaled 602 by an amount proportional to the magnitude of the density error. Next, a first diffusion value is computed 603 for a horizontally adjacent pixel and a second diffusion value is computed 603 for a vertically adjacent pixel. After computation 603, the diffusion values are next stored 604.

In one embodiment, the error diffusion is performed by a processor implementing program instructions. The following computer code excerpt computes the error to be diffused:

```
/*Assign a bitonal value to the contone value and
compute an error term*/ if (value > 128){
        emit_pixel(0);      /*lighter pixel -> zero bit*/
        error = value - 255;
    else {
        emit_pixel(1);      /*darker pixel -> one bit*/
        error = value;
        }

/* Compute an error diffusion value using random perturbation where
the variance is proportional to the size of the error*/ if (error < -128 || error >= 128)
        err = error/2 - randombyte();
    else if (error < -64 || error >= 64)
        err = error/2 - randombyte()/2;
    else if (error < -32 || error >= 32)
        err = error/2 - randombyte()/4;
    else if (error < -16 || error >= 16)
        err = error/2 - randombyte()/8;
    else if (error < -8 || error >= 8)
        err = error/2 - randombyte()/16;
    else if (error < -4 || error >= 4)
        err = error/2 - randombyte()/32;
    else if (error < -2 || error >= 2)
        err = error/2 - randombyte()/64;
    else
        err = error/2;    /*add this to the pixel below*/ error -= err;         /*add this to the pixel to the right*/
```

It should be noted that the function random byte() above, returns a pseudo-random number between -128 and 127 inclusive and that emit $_{13}$pixel() is a subroutine that stores one bit of information that is a bitonal pixel value.

Figure 8:
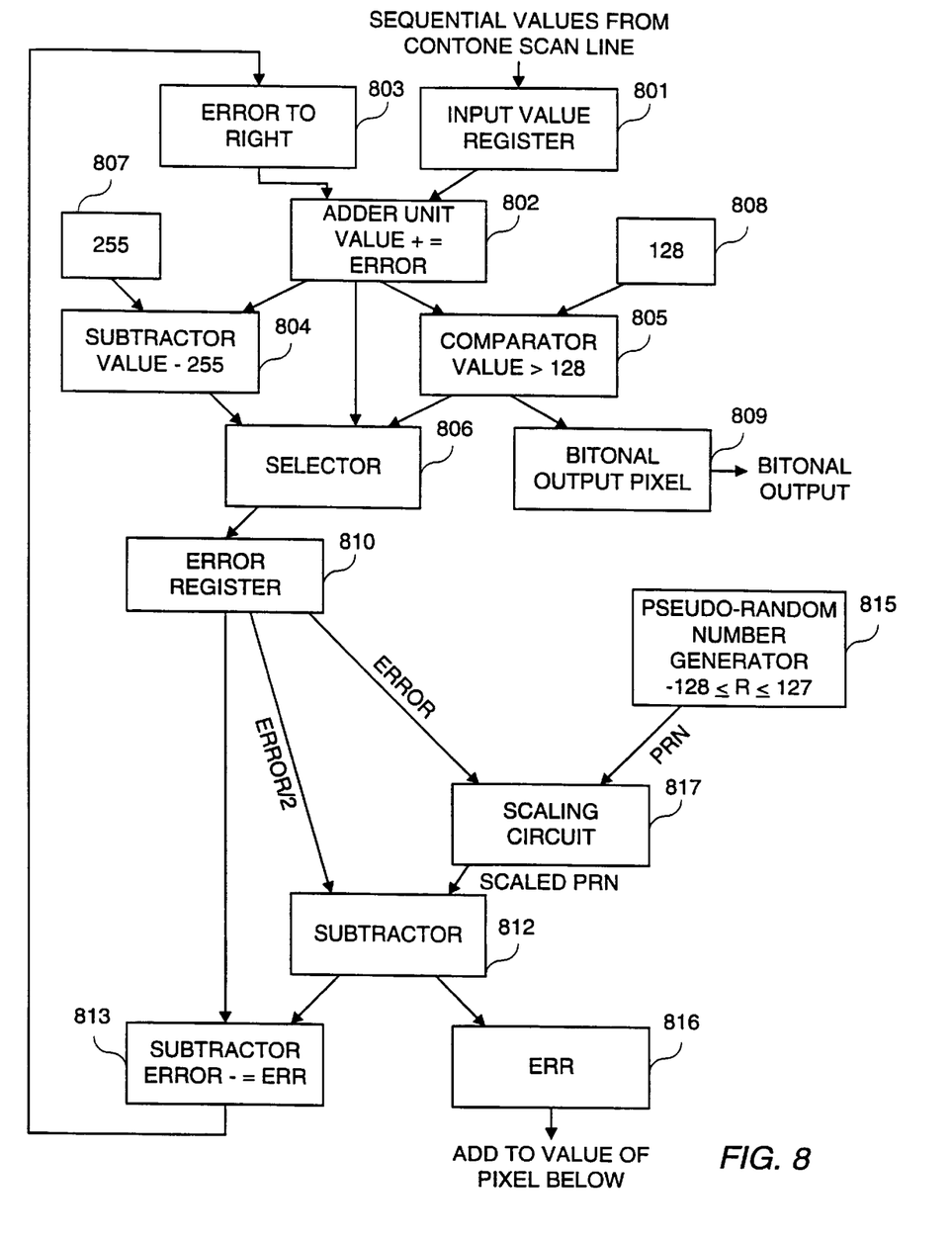
FIG. 8 is a functional block diagram of a hardware system which implements error diffusion.

In another embodiment, error diffusion is performed using a hardware system implemented in an application specific integrated circuit (ASIC). FIG. 8 is a functional block diagram of the hardware system 800 which implements error diffusion. System 800 includes input value register 801. Input value register 801 is an eight bit register which latches an eight bit contone value. Input value register 801 is coupled to adder 802. Adder 802 is also coupled to error to right register 803. Adder 802 sums the values in the error to right register 803 and input value register 801 to generate an output which is coupled to subtractor 804, comparator 805 and selector 806. Subtractor 804 is coupled to operand source 807. Operand source 807 supplies a constant "255" value. Subtractor 804 generates at its output a value equal to the adder output less 255. Comparator 805 receives as a second input a constant value of 128 from constant source 808. Comparator 805 generates a binary output (either a "1" or a "0") based on adder 802 output being either greater than 128 or less than or equal to 128. The binary output of comparator 805 is a bitonal output pixel 809. The binary output of comparator 805 is additionally coupled to a select input of selector 806. Selector 806 generates at its output a value generated by either subtractor 804 or by adder 802 responsive to the select input. If the select input is set to the "0" state (this happens if comparator 805 output indicates that the input contone value is greater than 128) then selector 806 selects to pass through the value received from subtractor 804. If however, the selector input is set to the "1" state, (this happens if comparator 805 output indicates that the output contone value is less than or equal to 128) then selector 806 passes through the value received from adder 802. The output of selector 806 (i.e. the "passed through" value) is coupled to error register 810. Error register 810 latches the error value generator by selector 806. Error register 810 is coupled to scaling circuit 817, subtractor 812, and subtractor 813. Scaling circuit 817 is coupled to random number generator 815 and scales the pseudo random number generated by pseudo random number generator 815 by an amount proportional to the magnitude of the value stored in error register 810.

Figure 9A:
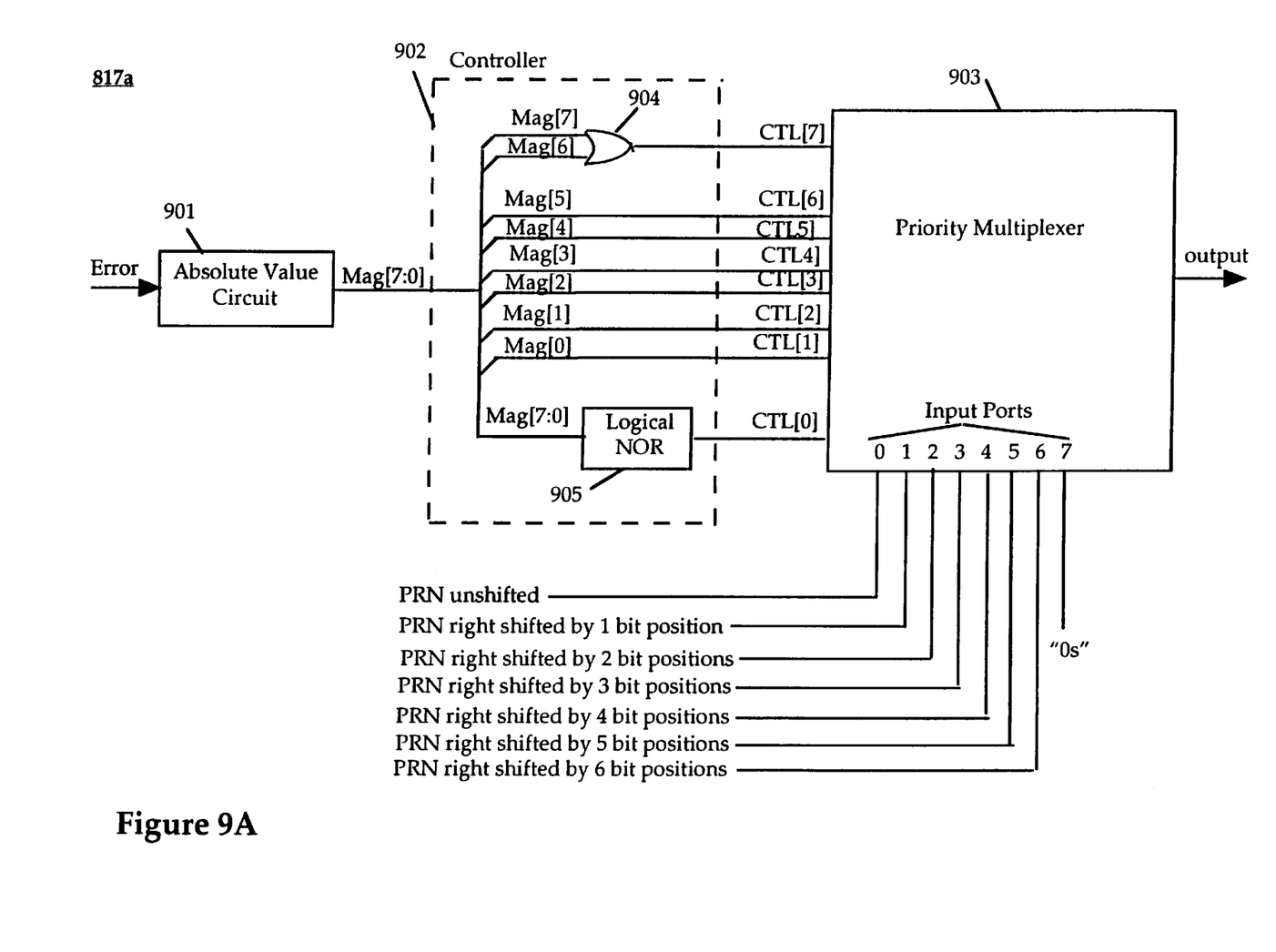
FIG. 9A is a functional block diagram of a first implementation of the scaling circuit shown in FIG. 8.
Figure 9B:
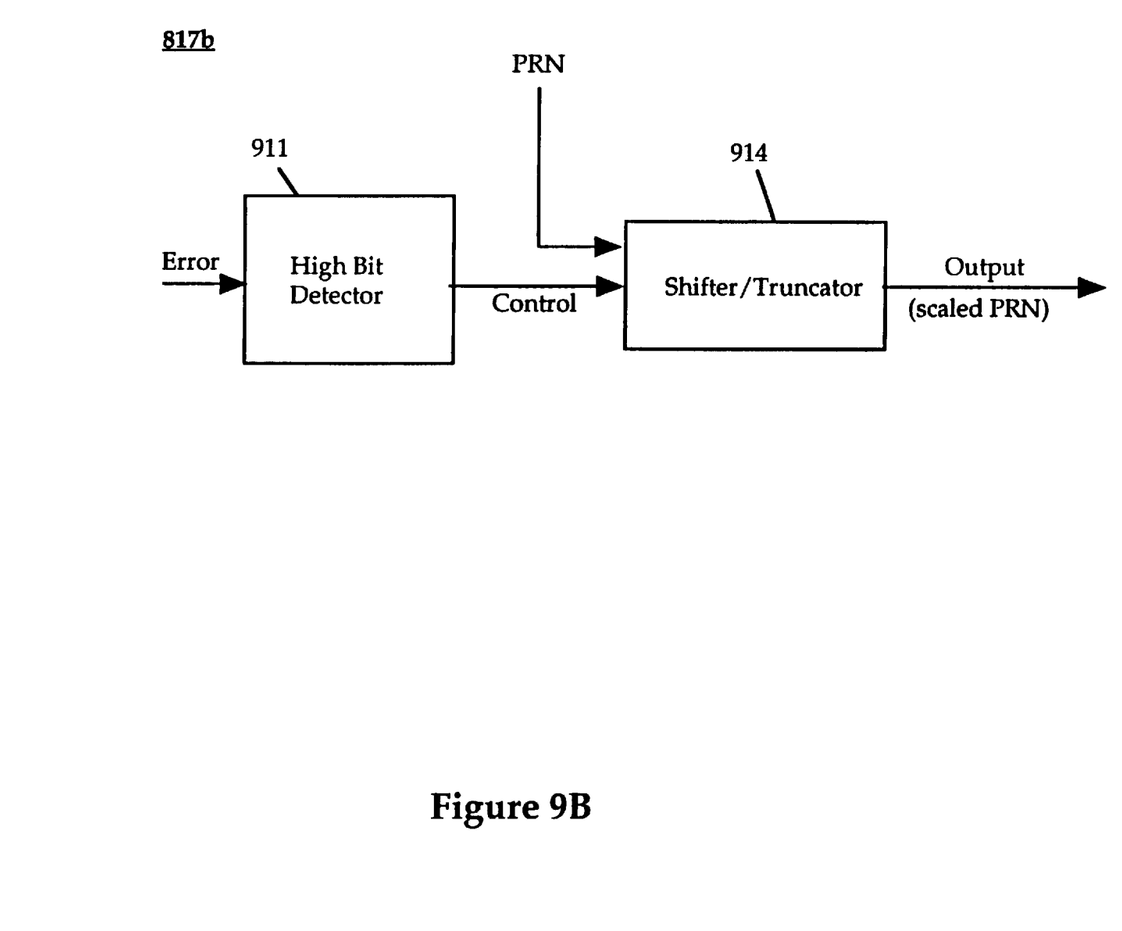
FIG. 9B is a functional block diagram of an alternative implementation of the scaling circuit shown in FIG. 8.

FIG. 9A is a functional block diagram of a first scaling circuit 817a and FIG. 9B is a functional block diagram of an alternative scaling circuit. Referring to FIG. 9A, scaling circuit 817a includes an absolute value circuit 901, a controller 902 and a priority multiplexer 903. Absolute value circuit 901 received an error value from error register 810 and generates at its output an eight bit magnitude value (Mag[7:0]) corresponding to the absolute value of its input.

The output (Mag[7:0]) is coupled to controller 902. Controller 902 generates eight controls signals (CTL[7:0]) which are coupled to and control priority multiplexer 903. The control signals CTL[7:0} are generated as follows: The two high order bits of the magnitude value (Mag[7] and Mag[6]) are logically "ORed" together using OR circuit 904 to form CTL[7]. CTL[6:1] are generated by passing through low order magnitude bits Mag[5:0]. The final control bit CTL[0] is generated by logically "NORing" all eight magnitude bits (Mag[7:0]) with NOR circuit 905. Thus, if all eight input bits are zero, then the eighth output bit is a logical "1", otherwise it is a logical "0".

The outputs of controller 902 are coupled to priority multiplexer 903 and are used to control the output selection of priority multiplexer 903. Priority multiplexer 903 has eight input ports. The first input port is coupled to the output of the pseudo random number generator 815 such that the priority multiplexer receives at input port 0 an unshifted version of the pseudo random number (PRN) generated by generator 815. Input ports 1–6 each receive successively right shifted versions of the PRN. The shifted versions are numerically equivalent to the arithmetic shift right instruction commonly performed by a computer. This right shifting is equivalent to successive signed integer division by two. Input port 7 is configured to have each input bit tied to a logical "0".

Priority multiplexer 903 selects one of the eight input ports for coupling to the output port in response to control inputs CTL[7:0]. Specifically, if CTL[7] is a logical "1" then input port 0 is passed through as the output of priority multiplexer 903. If CTL[6] is the highest order control bit to be a logical "1" then input port 1 is passed through as the output of priority multiplexer 903. If CTL[5] is the highest order control bit to be a logical "1" then input port 2 is passed through as the output of priority multiplexer 903. If CTL[4] is the highest order control bit to be a logical "1" then input port 3 is passed through as the output of priority multiplexer 903. If CTL[3] is the highest order control bit to be a logical "1" then input port 4 is passed through as the output of priority multiplexer 903. If CTL[2] is the highest order control bit to be a logical "1" then input port 5 is passed through as the output of priority multiplexer 903. If CTL[1] is the highest order control bit to be a logical "1" then input port 6 is passed through as the output of priority multiplexer 903. If CTL[0] is the highest order control bit to be a logical "1" then input port 7 is passed through as the output of priority multiplexer 903.

Thus, scaling circuit 817a generates at its output a scaled version of the pseudo random number generated by generator 815, scaled in accordance with the magnitude of the error stored in error register 810.

FIG. 9B is a functional block diagram of an alternative scaling circuit 817b. Scaling circuit 817b includes a high bit detector 911 and a shifter 914.

High bit detector 911 operates on signed two's complement binary numbers (input values). In the following examples bits in the binary input value are numbered from right (least significant bit) to left (most significant bit). The least significant bit is bit 0. Table 1 shows exemplary two's complement numbers with an identification of the "high bit" for each number.

TABLE 1

High Bit Detection

| Number | Two's complement binary | High bit |
| --- | --- | --- |
| 128 | 010000000 | 7 |
| −129 | 101111111 | 7 |
| 126 | 001111110 | 6 |
| −126 | 110000010 | 6 |
| 64 | 001000000 | 6 |
| −65 | 110111111 | 6 |

The high bit is the first bit, starting from the left, that differs from the sign bit. High bit detector 911 includes a detection sub-unit for each bit of the input of high bit detector 911. Each detection sub-unit has three inputs, a high bit detector 911 input bit, the sign bit and the logical OR of all the outputs of all detection sub-units to the left of the associated input bit (i.e. the sub-units associated with input bits in higher bit positions). The detection sub-unit registers "true" (a logical "1") if and only if the logical OR of all detection sub-units to its left is "false" (a logical "0") and its bit differs from the sign bit. Otherwise the detection sub-unit generates "false" (a logical "0" output indicating that the associated input bit is not the high bit. At most one of the detection sub-units generate a "true" (logical "1") output. For the input values, 0 and −1, none of the detection sub-units generate a "true" (logical "1") output. The outputs of each detection sub-unit are combined to generate a high bit detector 911 output indicating which input bit is the high bit.

The output of high bit detector 911 is coupled to shifter 914. Shifter 914 is also coupled to random number generator 815. Random number generator 815 generates a pseudo random number between −128 and 127 inclusive. Shifter 914 scales the random number received from random number generator 815 in response to the output of high bit detector 911. Thus, shifter 914 effectively scales the random number by an amount proportional to the magnitude of the error stored in error register 810. Table 2, below shows the amount of shifting that takes place in response to various detected high bits.

TABLE 2

| High Bit Detected | Shift Amount |
| --- | --- |
| 7 | No shift |
| 6 | Shift right 1 bit |
| 5 | Shift right 2 bits |
| 4 | Shift right 3 bits |
| 3 | Shift right 4 bits |
| 2 | Shift right 5 bits |
| 1 | Shift right 6 bits |
| 0 or none | Zero the output of the shifter |

Shifting is not the only way of reducing the range of a signed random number while preserving its sign and randomness. In an alternative embodiment, such scaling is accomplished by truncating the most significant bits and extending the sign bits to replace the truncated bit values. Thus, a truncator copies the sign bit of the random number into one or more of the high order bits of the random number. This operation reduces the range of the number by a power of two and preserves the sign and the randomness. For example, consider numbers between 0 and 127, 0XXXXXXX in binary where X stands for an unknown binary digit, a zero or a one. The sign bit is the high bit, bit 7 in this case, a zero. If the sign bit is extended to bit 6, then the resulting number is 00XXXXXX binary, a number between 0 and 63. The result is a scaled down number, similar to shifting the value right 1 bit. As another example, consider the numbers between −1 and −128, 1XXXXXXX in binary. The sign bit is a one in this case. If the sign bit is extended into bits 6 and bit 5, the result is 111XXXXX binary, a number between −1 and −32. This result scales the binary number and is similar to shifting the value right 2 bits.

The above examples show that the truncation operation achieves similar results to shifting. The final values, however, are not identical between shifting and truncating because different bits are preserved or lost and the preserved bits end up in different positions. But the range of possible values matches. When truncation is used, the truncation control shown in Table 3 is used.

TABLE 3

| High Bit Detected | Truncation |
| --- | --- |
| 7 | no truncation |
| 6 | write sign bit to bit 6 |
| 5 | write sign bit to bit 5 & 6 |
| 4 | write sign bit to bit 4, 5 & 6 |
| 3 | write sign bit to bit 3, 4, 5 & 6 |
| 2 | write sign bit to bit 2, 3, 4, 5 & 6 |
| 1 | write sign bit to bit 1, 2, 3, 4, 5 & 6 |
| 0 or none | zero the output of the shifter |

For some implementations, shifting is the preferred way to scale the pseudo-random numbers, particularly for hardware implementations because standard shifting logic units can be used. For other implementations, truncation is preferred for speed and efficiency.

Referring now again to FIG. 8, subtractor 812 is coupled to the output of scaling circuit 817 (i.e. the scaled random number) and to error register 810. The coupling between error register 810 and subtractor 812 shifts the error value to the right one bit so that subtractor 812 receives a right shifted version of the error (error/2). Subtractor 812 subtracts the scaled random number from the error/2 value. The output of subtractor 812 is coupled to err output 816. Err output 816 is a register which stores the error diffusion value to be added to the pixel block below the current pixel block. The output of subtractor 812 is also coupled to subtractor 813. Subtractor 813 subtracts the output of subtractor 812 from the value received from error register 810. Subtractor 813 thus generates at its output a value to be diffused to the pixel block to the right. This subtractor 813 output is stored in error to right register 803.

Figure 7:
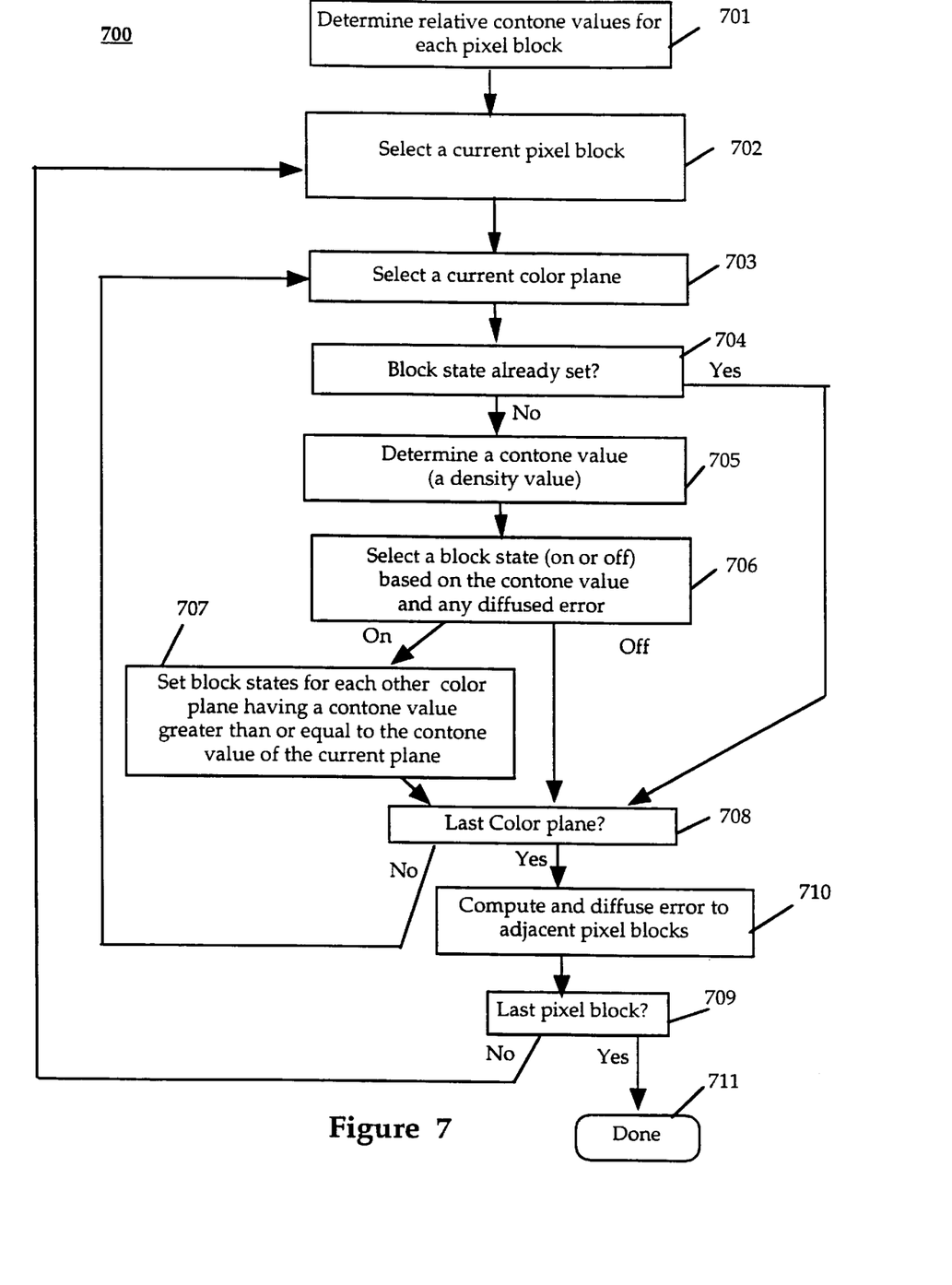
FIG. 7 is a flow diagram of a lossy compression method that performs the contone conversion and the bitonal conversion shown in FIG. 4 on a color image.

As previously discussed, the system and method of the present invention is adapted to perform lossy compression on color as well as back and white images. FIG. 7 is a flow diagram of a lossy compression method 700 that performs contone conversion 402 and bitonal conversion 403 applied to an image band of a color image. The processing of the preferred embodiment uses three color planes (cyan, magenta and yellow) and thus the color image (either bitonal or contone) being processed has three color planes (cyan, magenta and yellow). In the case of a bitonal color image, each color plane comprises a set of bitonal pixels. In the case of a contone color image, each color plane comprises a set of contone color pixels. Although the error diffusion method described above in reference to FIGS. 5 and 6 could be applied to color images by applying the methods to each color plane on an individual basis, such an application would yield undesirable image results due to a phasing mismatch. The phasing mismatch occurs from a misalignment of the respective color planes. Such a misalignment can arise when two color planes have constant, but slightly different color levels. A plane by plane application of the methods described above would yield two patterns of on and off dots (pixels). Unless the color levels and the error terms coming into the regions are equal, the dot patterns will not line up with each other. In these cases, there will be some dots that are superimposed and some that are not. Additionally there may be subregions that have superimposed dots next to subregions that do not have superimposed dots. Because superimposed inks look different from separately inked dots (pixels) next to each other, these subregions will each appear to be a slightly different color and thus will make the constant color region look blotchy. Hence, diffusing error over color planes independently causes poor image quality. Thus, the method of the present invention performs lossy compression on bitonal color images and contone color images by diffusing error over a given color plane in a manner dependent on the density of the other color planes.

Referring still to FIG. 7, the method 700 starts with the determination 701 of the relative ordering of the contone value (density value) associated with each color plane of each pixel block. In the case of a bitonal color image, to determine 701 the relative ordering, a contone value for each color plane is computed for each pixel block by summing the number of "on" pixels in each color plane of each pixel block. In the case of a contone color image, if each pixel block is a single pixel, then no contone computation is required because each pixel value is already a contone value. If, however, the pixel block includes more than one pixel, then the values of those pixels are combined to determine a single contone value for each color plane of each pixel block. In the preferred embodiment, the color image has three color planes: cyan, magenta and yellow. With three color planes, there are thirteen possible relative orderings and thus the relative ordering is stored for each pixel group as an integer code between 1 and 13. The relative density orderings and corresponding integer codes are shown in Table 4 below:

TABLE 4

| Integer | Ordering |
| --- | --- |
| 1 | C < M < Y |
| 2 | C = M < Y |
| 3 | C < M = Y |
| 4 | C = M = Y |
| 5 | Y < M < C |
| 6 | Y = M < C |
| 7 | Y < M = C |
| 8 | M < Y < C |
| 9 | M < Y = C |
| 10 | M < C < Y |
| 11 | Y < C < M |
| 12 | Y = C < M |
| 13 | C < Y < M |

After the relative density ordering is determined 701, the method next selects 702 a current pixel block (current block) and then selects 703 a current color plane (current plane). In the preferred embodiment the cyan is selected first. The method next determines 704 whether the block state for the current plane of the current block is already set (selected). If the method determines 704 that the block state is already set, the method proceeds to test 708. Otherwise, the method proceeds to determine 705 a contone value for the current plane of the current block. In the preferred embodiment, the contone value is determined 705 by retrieving a stored contone value computed during the determination 701 of the relative contone values. Then, using the contone value and any previously computed error diffusion for the current plane of the current block, the method selects 706 a block state (e.g. "on" or "off"). If the method selects the "off" state, the method then proceeds to test 708. Otherwise, the method selects the "on" state and proceeds to set 707 the block states of each other color plane having an original unadjusted contone value greater than or equal to the contone value of the current plane to be "on" as well. Thus, if any pixel block is set to an "on" state then the block states of each other pixel block originally having a larger or equal contone value will also be set "on" thus forcing the dot patterns to be in phase (aligned). After setting 707 the other color planes the method proceeds to test 708. Test 708 determines whether the current plane is the last color plane. If the current plane is not the last color plane (i.e. there are other color planes to process such as magenta or yellow), the method proceeds to select 703 a next color plane. In the preferred embodiment the cyan plane is processed first, the magenta plane is processed second and the yellow plane is processed last. If, however, the test 708 determines that the current color plane is the last color plane, the method then computes 710 a density error for each color plane and diffuses a percentage of the error to first and second adjacent pixel blocks, preferably to a horizontally adjacent pixel block and to a vertically adjacent pixel block. Preferably, the error is diffused using the random perturbation method described in reference to FIGS. 6 and 8. After computing 710, the method determines 709 whether the current pixel block is the final pixel block. If the current pixel block is not the last pixel block, then the method returns to select 702 a next pixel block. Otherwise, the method is done 711.

In order to obtain an efficient implementation, the method shown in FIG. 7 is preferably implemented using non-looping "in-line" code where the progression from color plane to color plane is made without the need for performing test 708 and wherein the selection 703 of the next color plane is predetermined in the computer program. Program code implementing the method of processing a color bitonal image is shown in the Microfiche Appendix, incorporated herein by reference.

The color plane inter-dependency in the above-described lossy compression of both bitonal and contone color images advantageously keeps the dot patterns of each color plane in phase and thus reduces any degradation in image quality.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method of compressing a bitonal image comprising:
   selecting a portion of the bitonal image;
   determining a contone value associated with the selected portion of the bitonal image;
   converting the contone value to a bitonal value;
   determining an error associated with the conversion to a bitonal value; and diffusing the error to portions of the image adjacent the selected portion, wherein diffusing the error includes diffusing a pseudo-random portion of the error to a first adjacent region and diffusing a remaining portion of the error to a second adjacent region.

2. The method of claim 1 wherein the pseudo-random portion is responsive to magnitude of the error.

3. A method of compressing a bitonal color image having a plurality of color planes, the method comprising:

selecting a portion of the bitonal color image;

for each color plane, determining a contone value corresponding to the selected image portion, thereby producing a set of contone values;

determining a relative ordering of the contone values across said color planes; and for each color plane, assigning a bitonal value to represent the selected image portion wherein the assignment is determined by the contone value for such color plane and the relative ordering of the contone values across said color planes.

4. The method of claim 3 wherein the assignment is further determined by a previously computed error diffusion value.

5. The method of claim 4 further comprising determining an error associated with the conversion to a bitonal value and diffusing the determined error to portions of the image adjacent the selected portion.

6. The method of claim 5 wherein diffusing includes diffusing a pseudo-random portion of the error to a first adjacent region and diffusing a remaining portion of the error to a second adjacent region.

7. The method of claim 6 wherein the pseudo-random portion is responsive to magnitude of the error.

8. A method of converting a color contone image having a plurality of color planes to a bitonal image, comprising:

selecting a portion of the color image;

determining a relative ordering of the contone values across said color planes; and for each color plane, assigning a bitonal value to represent the selected image portion wherein the assignment is determined by the contone value for such color plane and the relative ordering of the contone values across said color planes.

9. The method of claim 8 wherein the assignment is further determined by a previously computed error diffusion value.

10. A method of claim 9 further comprising determining an error associated with the conversion to a bitonal value and diffusing the determined error to portions of the image adjacent the selected portion.

11. The method of claim 10 wherein diffusing includes diffusing a pseudo-random portion of the error to a first adjacent region and diffusing a remaining portion of the error to a second adjacent region.

12. The method of claim 11 wherein the pseudo-random portion is responsive to magnitude of the error.

* * * * *

UNITED STATES PATENT AND TRADEMARK OFFICE
CERTIFICATE OF CORRECTION

PATENT NO.    :  5,867,632

DATED         :  February 2, 1999

INVENTOR(S)   :  Fred W. Andree and Geoffrey A. Dreher

It is certified that error appears in the above-identified patent and that said Letters Patent is hereby corrected as shown below:

On the title page, item [54] and column 1, line 2: replace "Glossy" with --Lossy--

Signed and Sealed this

Eighth Day of June, 1999

Attest:

Q. TODD DICKINSON

Attesting Officer

Acting Commissioner of Patents and Trademarks